(No Model.)
M. J. McCUE.
RUNNING GEAR FOR CARRIAGES.
No. 244,139. Patented July 12, 1881.
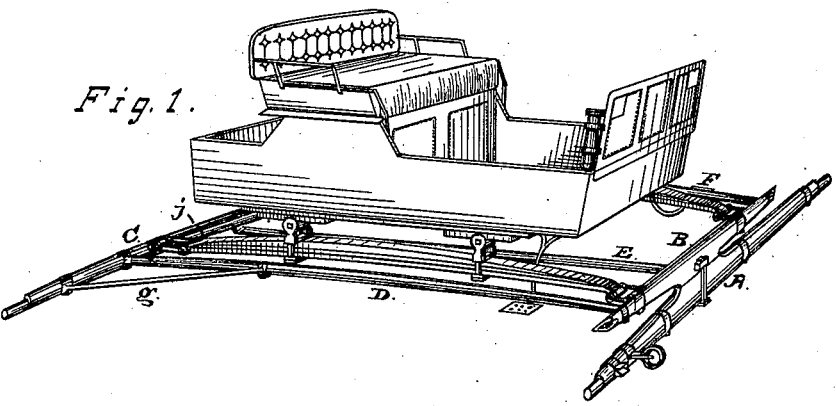
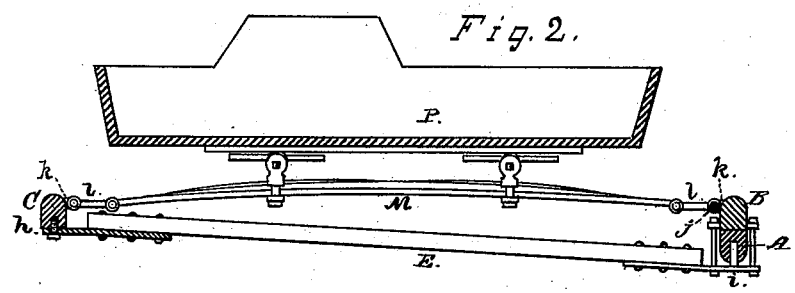
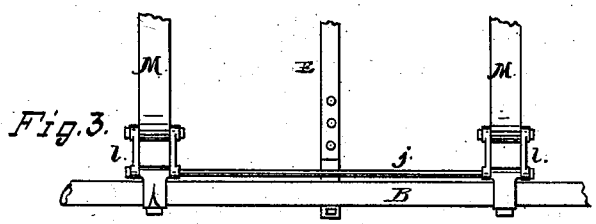
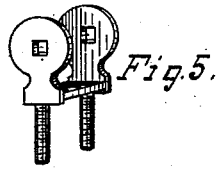
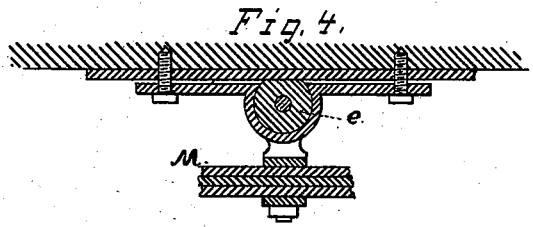
Witnesses:
Inventor,
Michael J. McCue
By his Atty's, Bonner & Osborn
N. PETERS, Photo-Lithographer, Washington, D. C.

UNITED STATES PATENT OFFICE.

MICHAEL J. McCUE, OF SAN FRANCISCO, CALIFORNIA.

RUNNING-GEAR FOR CARRIAGES.

SPECIFICATION forming part of Letters Patent No. 244,139, dated July 12, 1881.

Application filed March 26, 1881. (No model.)

*To all whom it may concern:*

Be it known that I, MICHAEL J. McCUE, of the city and county of San Francisco, in the State of California, have invented certain new and useful Improvements in Running-Gear for Carriages; and I do hereby declare that the following is a full, clear, and exact description thereof, reference being had to the accompanying drawings.

My invention relates to certain improvements in running-gear for buggies and carriages, and more especially in the arrangement for mounting and supporting the buggy or carriage bed, all as hereinafter described.

Referring to the accompanying drawings, Figure 1 is the body of the buggy with my improved running-gear connected therewith. Fig. 2 is a longitudinal section through the center. Fig. 3 is a detail plan view of the front of the bolster. Figs. 4, 5, and 6 show the manner of connecting the springs with the body of the buggy.

A is the front axle, and B is its bolster. D E F are the three reaches which I employ for connecting the bolster B with the rear axle, C; and $g$ is a brace which extends from each of the side reaches, D and F, to near the end of the rear axle.

The middle reach, E, I drop down lower than the side reaches, D F, by securing its rear end to the lower end of a vertical clip, $h$, which clasps the rear axle above it, so that the end of the reach will be below the axle. To the forward end of this reach I secure an upward-bent rod or bar, $i$, the end of which is clipped to the middle of the bolster, so that the reach is supported below both the axle and bolster, while the side reaches, D F, extend directly between the rear axle and the ends of the bolster in the ordinary way.

Against the rear side of the bolster, and also against the front side of the rear axle, and parallel with them, I secure a rod or shaft, $j$, in suitable eyes or bearings, $k\ k$, so that both shafts will rotate freely. Each shaft $j$ passes above the middle reach, E, and terminates inside of the side reaches.

On both ends of each rod or shaft I form or secure a fixed arm or crank, $l$. Both of the crank-arms on the front rod or shaft project rearward, while those on the rear rod or shaft project forward. A side or semi-elliptic spring, M, then connects each of the crank-arms of the rear shaft with the crank-arm of the front shaft immediately in front of it, and the buggy or carriage body P is supported upon these side springs. The ends of the springs M are connected with the crank-arms by shackle or joint connections, so that the free motion of the spring is not interfered with. This arrangement of the shafts $j$, with their crank-arms $l$ and the connecting-springs, gives an easy motion to the carriage-body, and equalizes the action of the springs without regard to the disposition of the weight or pressure contained in or brought to bear upon it. The semi-elliptic springs which I use are each made with a double bearing—that is, each spring consists of a base-spring having two sets of graduated leaves applied upon it, one set on each side of its middle, as shown. I then bolt the carriage-body to the spring at the middle of each set of leaves, so that the body is supported upon two bearings on each side.

In connecting the bearings of the spring to the buggy-bed I insert a block of india-rubber, $e$, Figs. 4 and 6, under or around each bolt that makes the fastening or connection, so that the bearing can yield under it, and thus allow the middle of the spring to bend. This provides a strong support for the body, and at the same time it allows the spring to yield in its middle as well as at each end, thus producing a much more yielding and pleasant motion than when a semi-elliptic spring of the usual kind is used. It will be noticed that by this arrangement the weight of the body and its load is supported upon the bolster inside of the outside reaches, D F, so that there is no danger of the ends of the bolster being broken off by a sudden jolt, as often occurs in the ordinary buggy or carriage when the springs are supported outside of the reaches, and in case any of the parts which support the body should break the body would fall upon the middle reach and be caught. I thus adapt a buggy or carriage so that an equalizing device can be applied to it, and yet retain all three of its reaches. I also transfer the strain nearer toward the middle of the bolster, and by using the semi-elliptic spring with a double bearing in connection with the equalizing device I provide an easy motion.

Having thus described my invention, what I claim, and desire to secure by Letters Patent, is—

1. The three reaches D E F, connected to the axles, as shown and described, in combination with the equalizing device, consisting of the shafts $jj$, with their crank-arms $l$, and semi-elliptic springs M, applied inside of the outside reaches, D F, substantially as and for the purpose set forth.

2. A running-gear for vehicles, consisting of the axles A C, bolster B, reaches D E F, and springs M, provided with bearings, and blocks $e$ of india-rubber placed under or around each bolt that connects the bearings with the body of the vehicle, substantially as shown, and for the purpose specified.

In witness whereof I have hereunto set my hand and seal.

MICHAEL J. McCUE. [L. S.]

Attest:
WM. F. CLARK,
EDWARD E. OSBORNE.